United States Patent Office 3,498,959
Patented Mar. 3, 1970

3,498,959
METHOD OF POLYMERIZING 3,3-DIMETHYL THIACYCLOBUTANE AND RESULTING POLYMER
George L. Brode, New Brunswick, N.J., assignor to Union Carbide Corporation, a corporation of New York
No Drawing. Continuation of application Ser. No. 392,037, Aug. 25, 1964. This application Sept. 11, 1968, Ser. No. 759,826
Int. Cl. C08g 23/00
U.S. Cl. 260—79   6 Claims

ABSTRACT OF THE DISCLOSURE

Linear, normally solid alkyl polysulfides have been prepared by contacting a thiacyclobutane with a polymerizing amount of an acidic Friedel Crafts catalyst. These polymers are water-white elastomeric polymers with glass transition temperatures of about 50° C.

---

This application is a continuation of application Ser. No. 392,037, filed Aug. 25, 1964, now abandoned.

This invention relates to aliphatic and cycloaliphatic sulfur containing monomers and polymers derived therefrom. More particularly, it relates to thermally stable sulfur containing monomers and polymers and methods of synthesizing them.

Although the inclusion of sulfur-containing groups in the backbone of linear, normally solid polymers could be expected to impart such desirable characteristics as increased melting or softening temperatures, enhanced adhesion and greater dye receptivity in the case of sulfone containing polymers and enhanced adhesion and low temperature flexibility in the case of sulfide containing polymers previous attempts to prepare such polymers have led to the formation of thermally unstable products.

It has now been discovered that thermally stable sulfur containing normally solid linear polymers can be prepared from bis-hydroxy alkyl sulfur compounds having the structure:

$$\text{HO—CH}_2\text{—}\underset{R_2}{\overset{R_1}{\text{C}}}\text{—CH}_2\text{—}\underset{(O)_x}{\overset{(O)_x}{\text{S}}}\text{—CH}_2\text{—}\underset{R_4}{\overset{R_3}{\text{C}}}\text{—CH}_2\text{—OH}$$

wherein $x$ is a whole number having values of 0 or 1 and each of $R_1$, $R_2$, $R_3$ and $R_4$ are lower hydrocarbon radicals having up to 10 carbon atoms as well as from 3,3-disubstituted thiacyclobutanes having the structure:

$$\underset{\underset{S}{\text{CH}_2\diagdown\diagup\text{CH}_2}}{\overset{M\diagdown\diagup T}{\text{C}}}$$

wherein each M and T are selected from the group consisting of hydrogen alkyl and alkenyl radicals containing up to 10 carbon atoms, alicyclic radicals containing from 5 to 7 carbon atoms, or alkoxyalkyl and alkenoxyalkyl radicals containing from 3 to 10 carbon atoms. The lower hydrocarbon radicals represented by $R_1$, $R_2$, $R_3$ and $R_4$ can be alkyl, alkenyl, cycloalkyl, or aromatic radicals.

Illustrative of the alkyl radicals which can be used are methyl, ethyl, n-propyl, isopropyl, n-butyl, isobutyl, sec-butyl, t-butyl, n-phentyl, isopentyl, n-hexyl, isohexyl, heptyl, isoheptyl, n-octyl, 2-ethylhexyl and like radicals.

Illustrative of the alkenyl radicals which can be used are those derived from ethylene, propene, 1-butene, 2-butene, 1-pentene, 2-pentene, 1-hexene and the like.

Representative alicyclic radicals are those available from cyclobutane, cyclopentane and cyclohexane as well as alkylated and halogenated derivatives thereof. Examples of alkoxyalkyl radicals include methoxymethyl, ethoxymethyl, propoxymethyl, butoxymethyl, methoxyethyl, ethoxyethyl and like radicals.

Examples of alkenoxyalkyl radicals include vinyloxymethyl, vinyloxyethyl, allyloxymethyl, allyoxyethyl and like radicals.

Aromatic radicals within the scope of this invention include phenyl radicals alkylated phenyl radicals such as tolyl, xylyl, cumyl and the like and halogenated phenyl radicals such as chlorophenyl, bromophenyl, iodophenyl and fluorophenyl.

MONOMER SYNTHESIS

The synthesis of the bis-hydroxy alkyl sulfides and sulfones is delineated in the equations below showing the preparation of bis(hydroxyneopentyl)sulfone:

$$2\text{BrCH}_2\text{C}(\text{CH}_3)_2\text{CH}_2\text{OH} \xrightarrow{\text{NaHS}} [\text{HOCH}_2\text{C}(\text{CH}_3)_2\text{CH}_2]_2\text{S}$$

$$[\text{HOCH}_2\text{C}(\text{CH}_3)_2]_2\text{S} \xrightarrow[\text{Anhydride}]{\text{Acetic}} [\text{CH}_3\text{CO}_2\text{CH}_2\text{C}(\text{CH}_3)_2\text{CH}_2]_2\text{S}$$

$$[\text{CH}_3\text{CO}_2\text{CH}_2\text{C}(\text{CH}_3)_2\text{CH}_2]_2\text{S} \xrightarrow{\text{H}_2\text{O}_2} [\text{CH}_3\text{CO}_2\text{CH}_2\text{C}(\text{CH}_3)_2\text{CH}_2]_2\text{SO}_2$$

$$[\text{CH}_3\text{CO}_2\text{CH}_2\text{C}(\text{CH}_3)_2\text{CH}_2]_2\text{SO}_2 \xrightarrow[\text{HCl}]{\text{CH}_3\text{OH}} [\text{HOCH}_2\text{C}(\text{CH}_3)_2\text{CH}_2]_2\text{SO}_2$$

The thiacyclobutanes can be readily prepared by reacting a glycol cyclic carbonate with either sodium or potassium thiocyanate in the melt according to the method described by S. Searles et al., J. Org. Chem., 27 2828 (1962) as illustrated below for the preparation of 3,3-dimethyl thiacyclobutane.

$$\underset{\underset{\underset{\text{O}}{\overset{\|}{\text{C}}}}{\text{O}\diagdown\diagup\text{O}}}{\overset{\overset{\text{CH}_3\diagdown\diagup\text{CH}_3}{\text{C}}}{\text{CH}_2\diagdown\diagup\text{CH}_2}} + \text{KSCN} \xrightarrow{180°} \underset{\underset{\text{S}}{\text{CH}_2\diagdown\diagup\text{CH}_2}}{\overset{\text{CH}_3\diagdown\diagup\text{CH}_3}{\text{C}}}$$

CONDENSATION POLYMERS

The polymers available from the bis(hydroxy alkyl) sulfides and sulfones of this invention are condensation polymers characterized as having the repeating unit represented by the structure:

$$\left[\text{—O—CH}_2\text{—}\underset{R_2}{\overset{R_1}{\text{C}}}\text{—CH}_2\text{—}\underset{(O)_x}{\overset{(O)_x}{\text{S}}}\text{—CH}_2\text{—}\underset{R_4}{\overset{R_3}{\text{C}}}\text{—CH}_2\text{—O—}\overset{O}{\overset{\|}{\text{C}}}\text{—D—}\right]_n$$

In the above structure each of $R_1$, $R_2$, $R_3$ and $R_4$ are lower hydrocarbon radicals having up to 10 carbon atoms, $x$ is a number having values of either 0 to 1, and $n$ is an integer having values sufficiently high as to represent a normally solid high polymer. The symbol D of the above structure is at least one of the following:

(a) $$-\text{Q}-\overset{O}{\overset{\|}{\text{C}}}-$$

(b) a bond between carbon and oxygen (c) $$-\overset{R_5}{\underset{|}{\text{N}}}-\text{Q}-\overset{R_5}{\underset{|}{\text{N}}}-\overset{O}{\overset{\|}{\text{C}}}-$$

wherein Q represents a divalent hydrocarbon group, and wherein each of $R_5$ and $R_6$ represents a monovalent lower hydrocargon group as represented by R above, or together represents a divalent alkylene bridge between the nitrogen atoms when Q is also an alkylene bridge, such as would result from piperazine.

Thus, as is readily seen, the polymers of this invention can be polyesters when D is represented by the structure (a) above or a polycarbonate when D is represented by (b) above, or a polyurethane when D is the structure represented by (c) above. It is, of course, contemplated that interpolymers are also possible in which different D groups are present in the same polymeric chains, as for example, in a poly(carbonate-urethane).

In this invention, Q can be any divalent hydrocarbon group, even those having a few as one or as many as 25 or more carbons atoms as for example, any of the alkylene radicals and preferably ethylene, tetramethylene, pentamethylene and hexamethylene radicals, as well as cycloalkylene and arylene radicals such as the 1.3-cyclobutylene, 1,3-cyclopentylene, 1,4-cyclohexylene, 2-cyclohexen-1,4 - ylene, 2,5-cyclohexadiene-1,4-ylene, 1,4-phenylene, 1,8 - naphthylene, 2,4-tolylene, 2,5-tolylene and similar groups as well as mixed phenylene bonded groups such as may result from the residues of polynuclear phenols such as those having the general formula

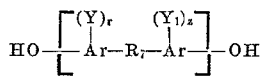

in which event the hydrocarbon Q group represents that residue between the brackets in which Ar is an aromatic divalent hydrocarbon such as phenylene, Y and $Y_1$ which can be the same or different are alkyl radicals preferably having from 1 to 4 carbon atoms, halogen atoms, i.e., fluorine, chlorine, bromine, and iodine, or alkoxy radicals, preferably having from 1 to 4 carbon atoms, r and z are integers having a value from 0 to a maximum value corresponding to the number of hydrogen atoms on the aromatic radical (Ar) which can be replaced by substituents and $R_7$ is a bond between adjacent carbon atoms as in dihydroxydiphenyl or is a divalent radical including for example

—O—, —S—, —SO—, —SO$_2$— and —S—S—, and divalent hydrocarbon radicals such as alkylene, alkylidene, cycloaliphatic, e.g., cycloalkylene, and cycloalkylidene, halogenated alkoxy or aryloxy substituted alkylene, alkylidene and cycloalpihatic radicals as well as alkarylene and aromatic radicals including halogenated, alkyl, alkoxy or aryloxy substituted aromatic radicals and a ring fused to an Ar group or $R_7$ can be polyalkoxy, or polysiloxy, or two or more alkylidene radicals separated by an aromatic ring, a tertiary amino group, an ether linkage, a carboxyl group or a sulfur containing group such as sulfoxide and the like.

Examples of specific dihydric polynuclear phenols include among others:

The bis(hydroxyphenyl)alkanes such as 2,2-bis(4-hydroxyphenyl)propane,
2,4'-dihydroxydiphenylmethane,
bis(2-hydroxyphenyl)methane,
bis(4-hydroxyphenyl)methane,
bis(4-hydroxy-2,6-dimethyl-3-methoxyphenyl) methane,
1,1-bis(p-hydroxyphenyl)ethane,
1,2-bis(4-hydroxyphenyl)ethane,
1,1-bis(4-hydroxy-2-chlorophenyl)ethane,
1,1-bis(3-methyl-4-hydroxyphenyl)ethane,
1,3-bis(3-methyl-4-hydroxyphenyl)propane,
2,2-bis(3-phenyl-4-hydroxy)propane,
2,2-bis(3-isopropyl-4-hydroxyphenyl)propane,
2,2-bis(2-isopropyl-4-hydroxyphenyl)propane,
2,2-bis(4-hydroxynaphthyl)propane,
2,2-bis(4-hydroxyphenyl)pentane,
3,3-bis(4-hydroxyphenyl)pentane,
2,2-bis(4-hydroxyphenyl)heptane,
bis(4-hydroxyphenyl)phenylmethane,
bis(4-hydroxyphenyl)cyclohexylmethane,
1,2-bis(4-hydroxyphenyl)1,2-bis(phenyl)propane,
2,2-bis-4-hydroxyphenyl-1-phenyl-propane and the like;

Di(hydroxyphenyl)sulfones such as bis(4 - hydroxyphenyl)-sulfone, 2,4'-dihydroxydiphenyl sulfone, 5'-chloro-2,4'-dihydroxydiphenyl sulfone, 5' - chloro-4,4'-dihydroxydiphenyl sulfone, and the like;

Di(hydroxyphenyl)ethers such as bis(4-hydroxyphenyl)ether,
the 4,3'-, 4,2'-, 2,2'- 2,3'- dihydroxydiphenyl ethers,
4,4'-dihydroxy-2,6'-dimethyldiphenyl ether,
bis(4-hydroxy-3-isobutylphenyl)ether,
bis(4-hydroxy-3-isopropylphenyl)ether,
bis(4-hydroxy-3-chlorophenyl)ether,
bis(4-hydroxy-3-fluorophenyl)ether,
bis(4-hydroxy-3-bromophenyl)ether,
bis(4-hydroxynaphthyl)ether,
bis(4-hydroxy-3-chloronaphthyl)ether,
bis(2-hydroxydiphenyl)ether,
4,4'-dihydroxy-2,6-dimethoxydiphenyl ether,
4,4'-dihydroxy-2,5-diethoxydiphenyl ether and the like.

Also suitable are the bisphenol reaction products of 4-vinyl-cyclohexene and phenols, e.g., 1,3-bis(p-hydroxyphenyl)-1-ethylcyclohexane, and the bisphenol reaction products of α-pinene or its isomers and phenols as well as bisphenols such as 1,3,3-trimethyl-1-(4-hydroxyphenyl)-6-hydroxyindane, and 2,4 - bis(4-hydroxyphenyl-4-methylpentane, and the like.

Particularly desirable polymers result from those wherein Q has the formula

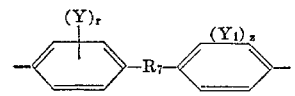

wherein Y and $Y_1$ are as previously defined, r and z have values from 0 to 4 inclusive, and $R_7$ is a divalent saturated aliphatic hydrocarbon radical, particularly alkylene and alkylidene radicals having from 1 to 3 carbon atoms, and cycloalkylene radicals having up to and including 9 carbon atoms.

It is understood that wherever cis- and trans- geometrical isomers exist in the chemical structures discussed in this invention that both are included unless specified to the contrary.

POLYESTERS OF BIS(HYDROXY ALKYL) SULFIDES AND SUFONES

The polyesters of this invention are conveniently prepared by the transesterification of a bis(hydroxy alkyl) sulfide or sulfone with a diester. This polymerization is illustrated by the reaction of bis(hydroxyneopentyl)sulfone with dimethyl terephthalate in the presence of tetrabutyl titanate, Ti(OC$_4$H$_9$)$_4$, as the transesterification catalyst.

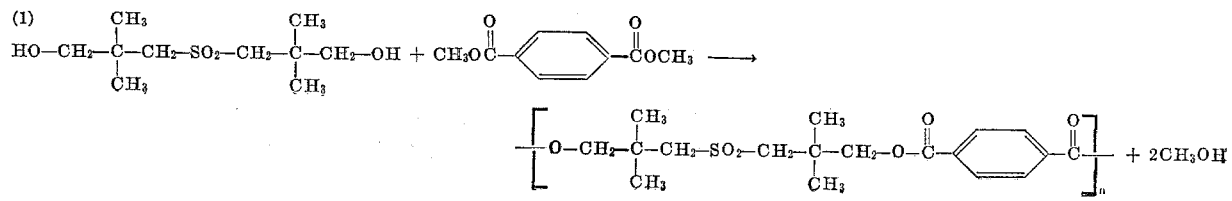

wherein $n$ is an integer having a value sufficiently high as to represent a normally solid polymer.

The reaction supra was modified by incorporating an alkylene glycol such as ethylene glycol as a comonomer with the bis(hydroxyalkyl)sulfone. In this case the resultant polyester may be characterized by the repeating unit:

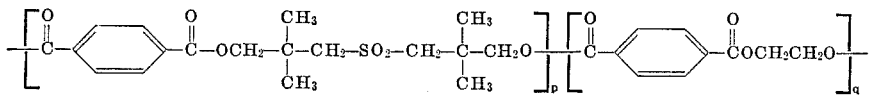

wherein $p$ and $q$ are integers the sum of which is sufficiently high as to afford a normally solid polymer.

As a further modification, it will be readily understood by those skilled in the art that other diesters can be substituted for dimethyl terephthalate including other arylene diesters as well as alkylene and cycloalkylene diesters.

These condensation polymerizations are preferably carried out in the melt in a batch or continuous process at subatmospheric pressures in a temperature range of about 150° C. to 300° C. The optimum temperatures and pressures used depend on the boiling points of the reactants and change as the polymerization progresses. This point is demonstrated in the examples which follow in which a typical heating time schedule is described.

The choice of transesterification catalysts is not critical and so in addition to tetrabutyl titanate other catalysts such as antimony trioxide, lead oxide, sodium, potassium or calcium hydrides and the like can also be used.

Although not narrowly critical, it is preferred that the ratio of hydroxyl reactants to diester reactant be essentially stoichiometric. While deviations from this ratio can be employed, they usually result in a polymer of lower molecular weight.

The polyesters of this invention are unusually thermally stable evincing no deterioration upon exposure to ambient temperatures as high as 285° C. and even higher. They can be readily compression molded or solution cast into films with physical and chemical properties qualifying them for use as a base for industrial tapes and photographic film as well as a packaging material. In addition, these polymers can be drawn into fibers which are uniquely dye receptive due to the presence of the $SO_2$ group in the polymer backgone, thus obviating the need for special treatment of the fibers or dying techniques.

POLYURETHANES OF BIS(HYDROXY ALKYL) SULFIDES AND SULFONES

The synthesis of polyurethanes of bis(hydroxy alkyl) sulfides or sulfones

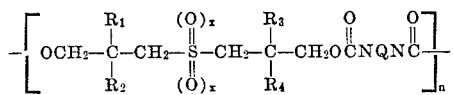

wherein $R_1$, $R_2$, $R_3$ and $R_4$ are lower hydrocarbon radicals having up to 10 carbon atoms, Q is a divalent hydrocarbon group, $x$ is a number having values of 0 or 1 and $n$ is an integer having values sufficiently high as to represent a normally solid polymer, can be effected by several procedures including the reaction of these sulfides or sulfones with polyisocyanates (2) or urethanes (3) as well as by the reaction of piperazine with bis(phenyl carbonates) of the bis(hydroxy alkyl) sulfides or sulfones (4) and (5).

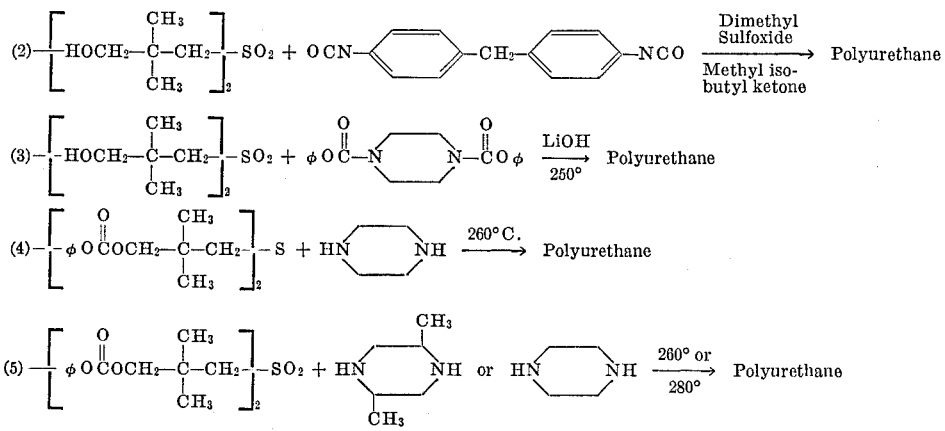

The polyisocyanates which are within the purview of the present invention are organic polyisocyanates containing two or more isocyanate groups. These organic polyisocyanates can be alkyl, cycloalkyl, aryl, aralkyl, alkaryl or aralkaryl polyisocyanates. Preferred aryl polyisocyanates are those whose groups are attached to different ring carbon atoms of the same or different aromatic nuclei. It is further preferred to employ as the aryl polyisocyanate of this invention, an aryl diisocyanate although triisocyanates or higher polyisocyanates can also be used, if preferred. For economic reasons, it is especially preferred to employ as the aryl diisocyanates, 2,4-diisocyanatotoluene or 2,4-tolylene diisocyanate (TDI) or dianisidine diisocyanate (3-methoxy-4-isocyanatobisphenyl).

As examples of other suitable polyisocyanates which can be employed herein can be mentioned, 1,2-diisocyanatoethane,
1,3-diisocyanatopropane,
1,2-diisocyanatopropane,
1,4-diisocyanatobutane,
1,5-diisocyanatopentane,
1,6-diisocyanatohexane,
bis(3-isocyanatopropyl)ether,
bis(3-isocyanatopropyl)sulfide,
1,7-diisocyanatoheptane,
1,5-diisocyanato-2,2-dimethylpentane,
1,6-diisocyanato-3-methoxyhexane,
1,8-diisocyanatooctane,
1,5-diisocyanato-2,2,4-trimethylpentane,
1,9-diisocyanatononane,
1,10-diisocyanatodecane,
1,6-diisocyanato-3-butoxyhexane, the bis(3-isocyanatopropyl)ethers of 1,4-butylene glycol,
1,11-diisocyanatoundecane,
1,12-diisocyanatododecane,
bis(isocyanatohexyl)sulfide,
1,4-diisocyanatobenzene, 2,4-diisocyanatotoluene,
1,3-diisocyanato-o-xylene,
1,3-diisocyanato-m-xylene,
1,3-diisocyanato-p-xylene,
2,4-diisocyanato-1-chlorobenzene,
2,4-diisocyanato-1-nitrobenzene,
2,5-diisocyanato-1-nitrobenzene,
3,6-diisocyanato-1,4-dichlorobenzene,
2,5-diisocyanato-1-chloro-4-methoxybenzene,
2,5-diisocyanato-1-methoxybenzene,
2,4-diisocyanato-1-methoxybenzene,
2,5-diisocyanato-1-methyl-4-methoxybenzene,
2,4-diisocyanato-1-ethylbenzene,
2,4-diisocyanato-1-ethoxybenzene,
4,6-diisocyanato-1,3-dimethoxybenzene,
2,5-diisocyanato-1,4-dimethoxybenzene,
2,4-diisocyanato-1-propylbenzene,
2,5-diisocyanato-1-propylbenzene,
2,4-diisocyanato-1-isobutylbenzene,
2,4-diisocyanato-1-isobutoxybenzene,
2,5-diisocyanato-1,4-diethoxybenzene,
1,3-diisocyanatocyclohexane,
1,4-diisocyanatocyclohexane,
1,4-diisocyanatonaphthalene,
1,5-diisocyanatonaphthalene,
2,6-diisocyanatonaphthalene,
2,7-diisocyanatonaphthalene,
1-(isocyanatomethyl)-2-(3-isocyanatopropyl)-3,5-dimethylcyclohexane,
1,3-bis(4-isocyanatophenyl)propane,
α,β-bis(2-isocyanatoethyl)-9,10-endoethylene dihydroanthracene,
2,4-diisocyanato-1-methylcyclohexane,
2,4-diisocyanato-1-ethylcyclohexane,
bis(4-isocyanatocyclohexyl)methane,
1,1-bis(4-isocyanatocyclohexyl)ethane,
2,2-bis(4-isocyanatocyclohexyl)propane,
bis(2-methyl-4-isocyanatohexyl)methane,
bis(3,5-dimethyl-4-isocyanatohexyl)methane,
1-isocyanatomethyl-4-isocyanatobenzene,
1-(2-isocyanatoethyl)-4-isocyanatobenzene,
1-(2-isocyanatoethyl)-3-isocyanatobenzene,
1-(3-isocyanatopropyl)-4-isocyanatobenzene,
1-(4-isocyanatobutyl)-4-isocyanatobenzene,
1,5-diisocyanatotetrahydronaphthalene,
4,4'-diisocyanatoazobenzene,
2-methyl-4,4'-diisocyanatoazobenzene,
4,4'-diisocyanato-1-naphthaleneazeobenzene,
2,4-diisocyanatodiphenyl ether,
dianisidene diisocyanate,
ethylene glycol bis(4-isocyanatophenyl)ether,
diethylene glycol bis(4-isocyanatophenyl)ether,
2,2'-diisocyanatobiphenyl,
2,4-diisocyanatobiphenyl,
4,4-diisocyanatobiphenyl,
3,3'-dimethoxy-4,4'-diisocyanatobiphenyl,
3,3'-dimethyl-4,4'-diisocyanatobiphenyl,
3,3'-dimethyl-4,4'-diisocyanatobiphenyl,
2-nitro-4,4'-diisocyanatobiphenyl,
bis(4-isocyanatophenyl)methane,
bis(2-methyl-4-isocyanatophenyl)methane,
2,2-bis(4-isocyanatophenyl)propane,
bis(2,5-dimethyl-4-isocyanatophenyl)methane,
cyclohexyl-bis(4-isocyanatophenyl)methane,
bis(3-methoxy-4-isocyanatophenyl)methane,
bis(4-methoxy-3-isocyanatophenyl)methane,
bis(2-methyl-5-methoxy-4-isocyanatophenyl)methane,
2,2-bis(3-chloro-4-isocyanatophenyl)propane,
2,2'-diisocyanatobenzophenone,
2,4-diisocyanatodibenzyl,
p-nitrophenyl-bis(4-isocyanatophenyl)methane,
phenyl-bis(2,5-dimethyl-4-isocyanatophenyl)methane,
2,7-diisocyanatofluorene,
2,6-diisocyanatophenanthroquinone,
3,6-diisocyanato-9-ethylcarbazole,
3,8-diisocyanatopyrene,
2,8-diisocyanatochrysene,
2,4-diisocyanatodiphenylsulfide,
bis(4-isocyanatophenyl)sulfide,
bis(4-isocyanatophenyl)sulfone,
bis(4-isocyanatobenzyl)sulfone,
2,4'-diisocyanato-4-methyldiphenylsulfone,
4-methyl-3-isocyanatobenzylsulfonyl-4'-isocyanatophenyl ester,
4-methoxy-3-isocyanatobenzylsulfonyl-4'-isocyanatophenyl ester,
bis(2-methyl-4-isocyanatophenyl)disulfide,
bis(3-methyl-4-isocyanatophenyl)disulfide,
bis(4-methyl-3-isocyanatophenyl)disulfide,
bis(4-methoxy-3-isocyanatophenyl)disulfide,
bis(3-methoxy-4-isocyanatophenyl)disulfide,
4-methyl-3-isocyanatobenzylsulfonyl-4-isocyanato-3-methylanilide,
N,N'-bis(4-isocyanatobenzylsulfonyl)1,2-diaminoethane,
bis(3-methoxy-4-isocyanatobenzyl)sulfone,
1,2-bis(4-methoxy-3-isocyanatobenzylsulfonyl)ethane,
N,N'-bis(4-methoxy-3-isocyanatobenzyl)-12, diaminoethane,
2,4,6-triisocyanatotoluene,
triisocyanatomesitylene,
1,3,7-triisocyanatonaphthalene,
2,4,4'-triisocyanatodiphenylmethane,
bis(2,5-diisocyanato-4-methylphenyl)methane,
tris(4-isocyanatophenyl)methane, and the like.

The urethanes which can be used in this invention are available through the reaction of piperazines with arylhaloformates by procedures well known in the art.

The piperazines preferred in the synthesis of the condensation polymers of this invention include piperazine itself as well as alkyl substituted piperazines such as 2,5-dimethylpiperazine, 2,5-diethylpiperazine, 2,3,5-trismethylpiperazine, 2,3,5,6-tetramethylpiperazine and the like. Both cis and trans forms of these alkyl substituted piperazines can be used.

The polyurethane syntheses can be carried out in the melt or in a solvent system by techniques well known in the art. Where solvents are employed, aliphatic ketones such as methyl isobutyl ketone, diisobutyl ketone and the like and high polar solvents such as dimethyl sulfoxide, dimethyl formamide and the like as well as mixtures of these solvents are useful. Subatmospheric pressures are preferred for the obtention of high molecular polyurethanes although atmospheric and superatmospheric pressures can also be used, if molecular weight and polymerization efficiency are not important.

It is preferred that the reactants be present in stoichiometric quantities although variations in the form of greater or less than any of the reactants can be used if the molecular of polyurethane is not important.

Polymerization catalysts are not essential and can be omitted if desired. When catalysts are used, alkali metal hydroxides such as lithium hydroxide and potassium hydroxide and the like are preferred. Other catalysts which can be used include sodium hydroxide and cesium hydroxide, as well as alkali metals themselves Na, K or Li and the like.

No workup of polyurethanes made in the melt is necessary. Those made in solution are recovered by precipitation with methanol, or other miscible, precipitating solvents.

Generally, the polyurethanes of this invention being thermally stable from about 210 to 285° C. are particularly useful as lacquers and for the formation of scuff and heat resistant coatings. The lower melting polyurethanes also serve as pressure sensitive adhesives for bonding metallic, cellulosic, siliceous, and polymeric substrates.

Polycarbonates of bis(hydroxy alkyl) sulfides and sulfones

The polycarbonates of this invention can be prepared by reaction of a bis(hydroxy alkyl) sulfide or sulfone with diphenyl carbonate, bis(hydroxy alkyl) sulfone bisphenyl carbonate, or with dibutyl carbonate. The polycarbonate shown below, obtained from bis(hydroxyneopentyl) sulfone, is illustrative of the products available:

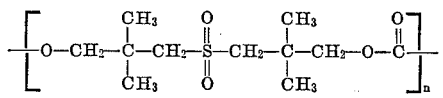

wherein $n$ is an integer sufficiently high to afford a normally solid polymer.

This preparation of these polycarbonates is effected at subatmospheric pressures in the melt and requires no special workup of the product. Suitable catalysts include those previously enumerated in the preparation of the polyesters of this invention.

The polycarbonates of this invention can be used as pressure sensitive adhesives.

ADDITION POLYMERS

The polysulfides and polysulfones of this invention, available by the cationic polymerization of 3,3-disubstituted thiacyclobutanes, are linear aliphatic addition polymers characterized by having the repeating unit represented by the structure:

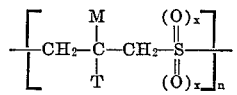

wherein $n$ is an integer having a value sufficiently high as to afford normally solid polymer, $x$ has a value of 0 to 1 and M and T are selected from the group consisting of hydrogen, alkyl, and alkenyl radicals containing up to 10 carbon atoms, alicyclic radicals containing from 5 to 7 carbon atoms, or alkoxyalkyl and alkenoxyalkyl radicals containing from 3 to 10 carbon atoms.

The cationic polymerization of these 3,3-disubstituted thiacyclobutanes is exemplified by the conversion of 3,3-dimethyl thiacyclobutane to poly(neopentylene sulfide) in methylene chloride using phosphorus pentafluoride, $PF_5$, as the cationic catalyst:

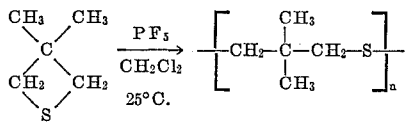

wherein $n$ is an integer sufficiently high as to afford a normally solid polymer. The polysulfides thus obtained are water-white elastomeric polymers with glass transition temperatures of about $-50°$ C.

The sulfone polymer, poly(neopentylene sulfone) can be prepared in quantitative yields by the oxidation of the corresponding polysulfide, poly(neopentylene sulfide) in 90% formic acid using 30% aqueous hydrogen peroxide as the oxidant. The oxidation system which effects conversion of these sulfides to sulfones is not specific or limited to the system described. Thus for conventional oxidants such as dilute potassium permanganate air or oxygen with catalysts such as cerium, manganous ion and the like can be used as well as such diverse techniques as electrolytic oxidation.

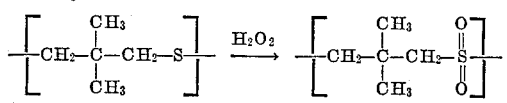

This polysulfone was highly crystalline having a melting point of about 300° C. As in the case of the condensation polymers previously described, various copolymers can be prepared employing two or more thiacyclobutanes having different substituents in the 3 position. In this manner, the melting or softening points, glass transition temperature hardness, adhesion and other physical properties can be shifted to tailor-make a specific polymer. If desired, crystallinity can be decreased and the melting point lowered by having unsymmetrical substituents in the 3 position, as for example, in 3-methyl-3-ethyl thiacyclobutane. In addition, by employing an unsaturated aliphatic substituent in the 3 position of a particular thiocyclobutane, a site for crosslinking is provided which affords a means for preparing insoluble or tougher polysulfides or polysulfones. A specific example of such a substituent is the allyloxymethyl group.

The cationic polymerization of the 3,3-disubstituted thiacyclobutanes can be carried out in bulk or solution continuously or batchwise. Suitable solvents which can be employed include among others, aromatic hydrocarbons such as benzene, toluene, ortho, meta or para xylene, ethyl benzene, cumene, and the like; chlorinated aromatic hydrocarbons such as chlorobenzene, ortho, meta or para dichlorobenzene, ortho, meta or para chlorobenzene, bromobenzene and the like; and chlorinated aliphatic hydrocarbons such as methylene chloride, ethylene dichloride, trichloroethylene chloroform, carbon tetrachloride, carbon tetrabromide, bromoform, and the like.

Friedel-Crafts catalysts are used to effect the cationic polymerization of the above-identified thiacyclobutanes. Preferred Friedel-Crafts catalysts include halides and oxides of such elements as aluminum, zinc, tin, antimony, iron, tantalum, niobium, galanium, hafnium, thorium, tungsten, bismuth, arsenic, boron, phosphorus, and the like as well as hydrates and etherates of some of these halides. Specific examples of suitable Friedel-Crafts catalysts include: $AlCl_3$, $AlBr_3$, $BF_3$, $ZnCl_2$, $FeCl_3$, $TaF_5$, $SnCl_4$, $TiCl_4$, $TiCl_3$, $BeCl_2$, $HfCl_4$, $ThCl_4$, $NbCl_5$, $TaCl_5$, $UCl_4$, $WCl_6$, $SbCl_5$, $BiCl_3$, $AsF_3$, $PF_5$, $AlO_3$, $TeO_3$, $P_2O_5$ and the like. Particularly preferred catalysts are $BF_3$, $BF_3$ etherate, $PF_5$, $PF_5$ etherate, $TaF_5$ and $NbF_5$.

The temperature of these thiacyclobutane polymerizations is not narrowly critical but a preferred range lies between about 0 and 30° C.

Recovery of these ploymers from the polymerization system is readily achieved by precipitation with miscible non-solvent as for example, methanol, ethanol, isopropanol and the like.

These polysulfides and polysulfones also exhibit unusual heat stability up to about 200° C. and are useful as elastomers and adhesives. Films can be cast from solution or molded and can be used at temperatures as low as $-50°$ C. where retention of flexibility is important in the case of the polysulfides.

The following examples are illustrative of this invention. All amounts and percentages are by weight unless otherwise specified.

Example 1.—Neopentyl bromohydrin

Neopentyl glycol (104.2 g. 1.0 mole) and 200 ml. of glacial acetic acid was refluxed with 5 ml. of 48% hydroformic acid for twenty minutes and then a solution of 1.1 mole (80 g.) of dry hydrogen bromide in 400 ml. glacial acetic acid was added dropwise, while refluxing, over a period of eight hours. The acetic acid was removed by vacuum distillation after an additional ten hour reflux, and to the undistilled residue was added 350 ml. of absolute ethanol, and 3 ml. of 48% hydrobromic acid. Ethanolethyl acetate was then removed by distillation through a twelve inch helices packed column until no further odor or ethyl acetate was detected. Distillation of the residue yielded 127 g. (86%) of the required neopentyl bromohydrin, B.P. 80°/13 mm.; $n_D^{20}$ 1.4809 (B.P. 76–80/13 mm.; $n_D^{20}$ 1.4825 reported by Searles, J. Org. Chem. 24, 1839 (1959)).

Example 2.—Bis(hydroxyneopentyl)sulfide

Into a two liter round bottom flask equipped with condenser (attached to a Dry Ice trap for collection of $H_2S$ by-product) and magnetic stirring bar, was placed 66.0 g. (.60 mole) of $NaHS \cdot 3H_2O$, 500 ml. of ethanol, 50 ml.

of water and 100 g. (.60 mole) of neopentylbromohydrin. The reactants were refluxed for sixty hours, cooled and acidified with concentrated hydrochloric acid. After neutralization with NaHCO$_3$, filtration and volume reduction in a solvent stripper, the oil that resulted was dissolved in methylene chloride, extracted with sodium hydroxide and washed until neutral with saturated sodium chloride solution; removal of solvent yielded 43 g. (68%) of crude material which was distilled through a Vigreaux column to give 41.6 g. of pure bis(hydroxyneopentyl)sulfide, B.P. 134–138/0.1 mm. The material immediately solidified on cooling, M.P. 55–57°, and had the required elemental analysis:

Calc. for C$_{10}$H$_{22}$O$_2$S: C, 58.20%; H, 10.75%; S, 15.54%. Found: 58.03%; H, 10.52%; S, 15.56%.

Example 3.—Bis(acetoxyneopentyl)sulfide

Bis(hydroxyneopentyl)sulfide, I, 36.0 g. (.17 mole) was refluxed with 80.0 g. (100% excess) of acetic anhydride for twenty hours, after which the excess acetic anhydride was stripped off and the product distilled through a 24 inch spinning band column to yield 42.3 g. (82%) of bis(acetoxyneopentyl)sulfide, B.P. 92°/.04 mm.; $n_D^{25}$ 1.4620.

Example 4.—Bis(acetoxyneopentyl)sulfone

In a three-neck flask equipped with condenser, dropping funnel, thermometer and stirrer bar was placed 81.0 g. (.28 mole) of bis(acetoxyneopentyl)sulfide, 324 g. (3.35 mole) acetic anhydride and 350 g. of glacial acetic acid. The solution was heated to 50° C. and 75.6 g. (.67 mole, 20% excess) of 30% hydrogen peroxide was cautiously added dropwise at a rate sufficient to maintain the temperature at 55–60° C.; the oxidation is extremely exothermic. The solution was then stirred at room temperature overnight and refluxed for two hours or until a negative peroxide test was observed, after which the acetic acid was removed in vacuo. An additional 150 g. of acetic anhydride was then added and the solution heated at 90° for an additional hour. After removal of the acetic acid-acetic anhydride, the crude material was dissolved in 300 ml. of benzene, washed till neutral with aqueous Na$_2$CO$_3$-NaCl solution, dried over MgSO$_4$-Na$_2$CO$_3$ and the benzene stripped off to yield 95.8 g. (98%) of crude sulfone diacetate. Distillation through a twenty-four inch spinning band column yielded 90 g. of pure bis(acetoxyneopentyl)sulfone B.P. 164°/.60 mm. $n_D^{25}$ 1.4665. The material analyzed correctly as follows.

Calc. for C$_{14}$H$_{26}$O$_6$S: C, 52.15%; H, 8.13%; S, 9.95%; O, 29.77%. Found: C, 52.04%; H, 8.07%; S, 10.01%; O, 29.77%.

Example.—Bis(hydroxyneopentyl)sulfone

To a solution of 68.7 g. (.21 mole) of bis(acetoxyneopentyl)sulfone in 150 ml. or anhydrous methanol was added 2.9 g. of dry hydrogen chloride through a gas dispersion tube. The mixture was refluxed overnight and then one third of the solution was distilled; and equal volume of anhydrous methanol was added and the solution refluxed and additional three hours. The mixture was then neutralized with NaHCO$_3$, filtered, and the methanol removed under reduced pressure to produce 50 g. (100% yield) of crude material. Recrystallization from benzene yielded 45.8 g. of product, M.P. 74–75° C., and additional recrystallization from benzene containing a small amount of methanol gave analytically pure bis(hydroxyneopentyl)sulfone, M.P. 75–76° having the following analysis:

Calc. for C$_{10}$H$_{22}$O$_4$S: C, 50.39%; H, 9.31%; O, 26.85%; S, 13.46%. Found: C, 50.21%; H, 9.37%; O, 26.65%; S, 13.59%.

The diol can be distilled with no evidence of decomposition. The sulfone diol was also prepared by direct oxidation of the sulfide diol, I, with 30% hydrogen peroxide in water using a tungstic acid catalyst.

Example 6.—Bis(3-hydroxy-2-ethyl-2-methylpropane) sulfone

Following the procedure of Example 5, bis(3-hydroxy-2-ethyl-2-methylpropane)sulfone can be prepared from 2-ethyl-2-methyl-1,3-propylene glycol.

Example 7.—Bis(3-hydroxy-2-methyl-2-phenylpropane sulfone

Following the procedure of Example 5, bis(3-hydroxy-2-methyl-2-phenylpropane)sufone can be prepared from 2-methyl-2-phenyl-1,3-propylene glycol.

Example 8.—3,3-dimethyl thiacyclobutane 3,3-dimethyl thiacyclobutane, B.P. 115° C. was prepared in a 60% yield by the method of S. Searles, J. Org. Chem. 24, 1839 (1959), which comprised reacting 73 g. (0.75 mole) of potassium thiocyanate with 65 g. (0.5 mole) of neopentylcarbonate in the melt at 180° C. The white mobile product was distilled directly from the reaction flask and used for polymerization after a single redistillation.

Example 9.—3-ethyl-3-methyleneallyloxy thiacyclobutane

Using the procedure referred to in Example 8, 3-ethyl-3-methyleneallyloxy thiacyclobutane was prepared by the reaction of 100 g. (0.5 mole) of 2-ethyl-2-methyleneallyloxy propylene glycol-1,3-cyclic carbonate with 97.2 g. (1.0 mole) of potassium thiocyanate at 185° C. The product was obtained in 70% yield and had a B.P.=162° C./144 mm. with the correct elemental analysis as follows:

Calc. for C$_9$H$_{16}$OS: C, 62.73%; H, 9.36%; S, 18.62%. Found: C, 62.50%; H, 9.62%; S, 18.36%.

Example 10.—3-methyl-3-ethyl thiacyclobutane

Using the procedure referred to in Example 8, 3-methyl-3-ethyl thiacyclobutane was prepared in 70% yield by the reaction of 288.4 g. (2.0 mole) of 2-methyl-2-ethyl-propylene glycol-1,3-cyclic carbonate and 292.0 g. (3.0 mole) potassium thiacyanate at 175° C. in the melt. This material had a boiling point of 149° C. with the correct analysis as follows:

Calc. for C$_6$H$_{12}$S: C, 62.01%; H, 10.41%; S, 27.59%. Found: C, 61.85%; H, 10.59%; S, 27.48%.

POLYESTERS

Example 11.—Terephthalate polymers of bis(hydroxyneopentyl)-sulfone

The subject class of polymers were prepared by standard melt techniques as described by the following typical example.

Into a side arm test tube equipped with a nitrogen ebulator was weighed 1.6966 g. (.0087 mole) dimethyl terephthalate (M.P. 140–141° C.), 1.5625 g. (.0065 mole, 75.2 mole percent) bis-(hydroxyneopentyl)sulfone (M.P. 75–76.5° C.), 0.81 g. (.013 mole) ethylene glycol (distilled from sodium) and 0.041 g. of a 10% Ti(OC$_4$H$_9$)$_4$ solution in butanol (1600 parts/10$^6$ based on polymer weight). These reactants were heated according to the following schedule under reduced pressure:

190° C.—seven hours (methanol allowed to wash down sublimed dimethyl terephthalate)
220° C.—one hour (nitrogen started)
240–250° C.—one hour
270–280° C.—two and one-half hours (eventually .08 mm. pressure)

The pale, straw colored polymer which was obtained in quantitative yield had a reduced viscosity (R.V.) of 1.08 (.0.2% in phenol-tetrachloroethane at 25° C.). The material could be compression molded at 190° C. to clear tough films. Analytical data of a series of products containing varying amounts of bis(hydroxyneopentyl)sulfone and ethylene glycol are recorded in Table 1 which also shows the general structure of the polymers obtained wherein the sum of the integers $x$ and $y$ is sufficient to afford a normally solid polymer. Physical properties relating to Examples 11a, 11b, and 11c are presented in Table 2.

TABLE 1.—SUMMARY OF TEREPHTHALATE POLYMERS BASED ON BIS(HYDROXYNEOPENTYL)SULFONE

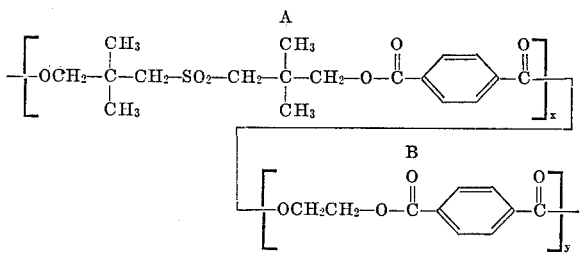

| Expt. | Wt. Percent A | Mole Percent A | Percent S Found | R.V. (2%) (25° C.) | Physical State |
|---|---|---|---|---|---|
| 11a | 79.7 | 67.2 | 6.93 | *1.08 | Amorphous. |
| 11b | 89.6 | 82 | 7.88 | *.95 | Do. |
| 11c | 89 | 82 | 8.81 | **.29, *46 | Do. |
| 11d | | 75 | | *.42 | Do. |
| 11e | 100 | 100 | | **.16 | Do. |
| 11f | 100 | 100 | | **.12 | Do. |
| 11g | 14.3 | 8.0 | 1.24 | *.46 | Crystalline. |

*Phenol-tetrachloroethane.
**Chloroform.

TABLE 2.—PHYSICAL PROPERTIES OF SULFONE DIOL ETHYLENE GLYCOL TEREPHTHALATE COPOLYMERS

| | 11a | 11b | 11c |
|---|---|---|---|
| Mole percent Sulfone Diol | 67.0 | 82.0 | 8.0 |
| R.V. (25° C.) (CHCl₃) | 0.64 | 0.54 | 0.46 |
| Tg° C | 90 | 95 | |
| Tm° C | (*) | (*) | 242-4 |
| Tensile Modulus (p.s.i.) (ASTM D-790-61) | 280,000 | 300,000 | |
| Tensile Strength (p.s.i.) (ASTM D-790-61) | 7,000 | 7,000 | |
| Elongation (percent) (ASTM D-790-61) | 4.5 | 3.5 | |
| Impact Strength (ft.-lb./in.³) (ASTM D-256-56) | 17 | 15 | |

*Amorphous.

Example 12.—Terephthalate polymer of bis(3-hydroxy-2-ethyl-2-methylpropane)sulfone Following the procedure outlined in Example 11, the corresponding terephthalate polymer is obtained from bis(3-hydroxy-2-ethyl-2-methylpropane)sulfone.

Example 13.—Terephthalate polymers of bis(3-hydroxy-2-methyl-2-phenylpropane)sulfone Following the procedure outlined in Example 11, the corresponding terephthalate polymer is obtained from bis(3-hydroxy-2-methyl-2-phenylpropane)sulfone.

Example 14.—Poly[neopentylene sulfone)hexamethylenedicarbamate]

To 4.1169 g. (.01727 mole) of molten bis(hydroxyneopentyl sulfone prepared in Example 5 stirred rapidly under a nitrogen atmosphere at 110° C., 2.9055 g. (.01727 mole) of redistilled hexamethylene diisocyanate was added dropwise. The addition time was twenty minutes, during which the temperature was gradually raised to 178° C. The temperature was then raised to 203° over forty minutes during which the solution became extremely viscous; heating was continued an additional two hours at 198–200° C. The polymer, which was of excellent color, was obtained in quantitative yield and had a reduced viscosity of 0.46 (0.2% in m-cresol at 25° C.). It could be compression molded at 200° C. with a slight drop in reduced viscosity (0.42 after molding). A sample of this material was dissolved in chloroform and coagulated in isopropanol to yield polymer with a reduced viscosity of 0.51 after drying. The material at this molecular weight had a Tg of 30–35° C. and resisted all efforts to induce crystallization.

Example 15.—[(Dineopentylene sulfone)methylene-bis (4-phenyl-carbamate]

Bis(hydroxyneopentyl)sulfone, 1.0099 g. (.004237 mole), methylene bis(4 - phenylisocyanate, 1.0602 g. (.004237 mole; B.P. 138–139°/20 mms.), 2.5 ml. of methyl isobutyl ketone (B.P. 116°), and 3.0 ml. dimethyl sulfoxide were stirred in an inert atmosphere for one hour at 91–102° and two hours at 118° C. To the viscous solution was added 5.0 ml. of dimethylsulfoxide and the solution was coagulated in water-isopropanol. After drying in vacuo at 75° overnight, the product weighed 2.0 g. (96% yield) and had a reduced viscosity of 0.36 (0.2% in dimethyl formamide—25° C.). The material could be compression molded at 190° C. to give brittle films.

Example 16.—Poly[(dineopentylene sulfone) N,N'-piperazine-dicarboxylate]

(A) Bis(hydroxyneopentyl)sulfone bis-phenyl carbonate, 3.5148 g. (.007345 mole) and 0.6390 g. (.007418 mole, 1% excess) piperazine were heated in a side-arm test tube under a nitrogen blanket to a temperature of 250° C. over a period of thirty-five minutes while allowing the phenol to reflux. The temperature was then raised to 270° C. and phenol collected over a period of two hours under a slow N₂ stream. After this time, the pressure was reduced to 0.03 mms. and the temperature raised to 380–285° C. for thirty-five minutes. The polymer, poly [(dineopentylene sulfone) N,N'-piperazine-dicarboxylate] obtained in quantitative yield crystallized immediately on cooling, M.P. 270°, and had a reduced viscosity of 0.32 (0.2% in m-cresol at 25° C.).

(B) Under conditions similar to those reported under (A) 2.0000 g. (.006129 mole) piperazine diphenyl carbonate, M.P. 180.6–181.2, 1.4608 g. (.006129 mole) bis (hydroxyneopentyl)-sulfone and .0013 g. LiOH·H₂O were heated in an inert atmosphere at temperatures around 245° for three hours; the polymer, poly-[(dineopentylene sulfone) N,N'-piperazine-dicarboxylate], obtained having a reduced viscosity of 0.18 (m-cresol).

Example 17.—Poly[(dineopentylene sulfone) trans-2,5-dimethyl-piperazine N,N'-dicarboxylate]

Into a side arm test tube was weighed 1.0858 g. (.002269 mole) of bis(hydroxyneopentyl)sulfone bisphenyl carbonate and 0.2592 g. (.002270 mole) trans-2,5-dimethyl piperazine (recrystallized from acetone, M.P. 117–118° C.). The reactants were heated to 220° C. over a period of two and one-half hours under a N₂ blanket with the occasional addition of several drops of toluene to dissolve the sublimed diamine. The temperature was then raised to 245° over a one hour period and phenol was allowed to distill. After this, the pressure was reduced to 0.5 mm. and the temperature raised to 250–260° C. for an additional 75 minutes. The polymer, poly[(dineopentylene sulfone)trans-2,5-dimethyl-piperazine N,N'-dicarboxylate] obtained in quantitative yield was amorphous and had a reduced viscosity of 0.34 (CHCl₃). A film case from chloroform had the following mechanical properties.

R.V._{CHCl₃}^{25°} _____ .34.
Tg. ° C. _____ 85.
Tm. ° C. _____ Amorphous.
Tensile mod. (p.s.i.) _____ 345,000.
Tensile strength (p.s.i.) _____ 4,400.
Elongation (percent) _____ 2.

Example 18.—Poly[(dineopentylene sulfide) trans-2,5-dimethyl-piperazine-N,N'-dicarboxylate]

Bis(hydroxyneopentyl)sulfide bis - phenylcarbonate, 1.0951 g. (.002452 mole) and trans-2,5-dimethylpiperazine, 0.2800 g. (.002452 mole) were reacted under conditions identical to those described under the preparation of the preceding polyurethane method A. The polymer, poly

[(dineopentylene sulfide) trans-2,5-dimethyl piperazine-N,N'-dicarboxylate], obtained in quantitative yield, had a reduced viscosity of 0.24 (0.2% in CHCl₃ at 25° C.).

Example 19.—Polyurethane of bis(3-hydroxy-2-ethyl-2-methyl-propane)sulfone

Following the procedure of Example 14 with bis(3-hydroxy-2-ethyl-2-methylpropane)sulfone and hexamethylene diisocyanate a similar polyurethane is obtained.

Example 20.—Polyurethane of bis(3-hydroxy-2-methyl-2-phenyl-propane)sulfone

Following the procedure of Example 16, the corresponding polyurethane is obtained from bis(3-hydroxy-2-methyl-2-phenylpropane)sulfone.

Example 21.—Bis(hydroxyneopentyl)sulfone-bis-phenyl-carbonate

In a dry reaction flask was placed 14.4 g. (.092 mole, 10% excess) of phenyl chloroformate and 40 ml. of dry benzene. The solution was cooled to zero degrees and 7.2 g. (.092 mole) of pyridine in 10 ml. of benzene was added. The heterogeneous mixture that resulted was allowed to warm to room temperature and 10.0 g. (0.042 mole) of bis(hydroxyneopentyl)sulfone was added in 50 ml. of dry benzene; after stirring at room temperature overnight, the mixture was heated at 60° for two hours. Work-up consisted of cooling the above mixture to zero degrees and washing with cold 10% HCl solution, cold 10% NaHCO₃ solution and ice-water. The benzene layer was dried over MgSO₄-Na₂CO₃, filtered and evaporated to yield 20.1 g. (100%) of a crude oil which eventually solidified. Recrystallization from hexane-benzene with charcoaling produced 17.4 g. of bis(hydroxyneopentyl)-sulfone-bis-phenylcarbonate white rosette crystals, M.P. 93.5–94.5° C., analyzing correctly as follows:

Calc.: C, 60.23%; H, 6.32%; S, 6.70%. Found: C, 60.56%; H, 6.36%; S, 6.47%.

Example 22.—Bis(hydroxyneopentyl)sulfide-bis-phenylcarbonate

Techniques similar to those described under Example 21 were employed for the preparation of bis(hydroxyneopentyl)sulfide - bis - phenylcarbonate. The following quantities were used: 24.8 g. (.158 mole, 10% excess) phenyl chloroformate in 70 ml. benzene, 12.5 g. (.158 mole, 10% excess) pyridine, 15.0 g. (.072 mole) sulfide diol in 90 ml. benzene. After removal of the benzene layer, 28.2 g. (87% yield) of crude product was obtained whose infrared spectrum showed, in addition to the expected bands, weak hydroxyl absorption. The product could not be crystallized and was distilled through a one-plate column and exhibited a boiling point of 220–224°/.08 mm. The material was pure enough to prepare polymer of moderate molecular weight without further work.

Example 23.—Poly[(dineopentylene sulfone)carbonate]

Bis(hydroxyneopentyl)sulfone, 1.0241 g. (.004297 mole), bis(hydroxyneopentyl)sulfone bis-phenyl carbonate, 2.0563 g. (.004297 mole) and 0.0011 g. LiOH·H₂O (366 parts/10⁶ based on starting weights) were heated in a N₂ atmosphere at 190–220° for one and one-half hours while allowing phenol to reflux. After this time, phenol was collected over a period of ninety minutes at 225° C. and then at 250–252° C. for an additional ninety minutes; at this point 86% of the theoretical amount of phenol had been collected. Polymerization was then continued in vacuo (.08 mm.) for 2¼ hours, the last forty-five minutes at a temperature of 280–285° C. during which time no further increase in viscosity was observed. The color of the low molecular weight polymer poly(dineopentylene sulfone) carbonate after this time was a very pale straw color. Table 3 summarizes this and other experiments.

TABLE 3.—SUMMARY OF POLYCARBONATE EXPERIMENTS

| Expt. | Reactants | Cat. | Conc. part/10⁶ | Max. T., ° C. | R.V.* CHCl₃ | Remarks |
|---|---|---|---|---|---|---|
| 23a | [HOCH₂C(CH₃)₂CH₂—]₂SO₂ + (φO)₂—C=O | LiOH | 710 | 252 | .05 | Yellow in color. |
| 23b | | LiOH | 526 | 270 | | Pale straw color. |
| 23c | | LiOH | 760 | 264 | .04 | Do. |
| 23d | [HOCH₂C(CH₃)₂CH₂—]₂SO₂ + [φOCOCH₂C(CH₃)₂CH₂—]₂SO₂ | LiOH | 366 | 284 | .11 | Pale straw color. |
| 23e | | LiOH | 366 | 255 | .08 | Amber. |
| 24f | | LiOH | 366 | 255 | .07 | Straw color. |
| 24g | | No cat. | | 255 | .06 | Do. |
| 23h | | Ti(OC₄H₉)₄ | 400 | 260 | .14 | Color poor. |
| 23i | [HOCH₂C(CH₃)—CH₂—]₂SO₂ + (C₄H₉O)₂C=O | Ti(OC₄H₉)₄ | 800 | 281 | .06 | Amber color. |
| 23j | [CH₃COOCH₂C(CH₃)—CH₂—]₂SO₂ + (C₄H₉O)₂C=O | Ti(OC₄H₉)₄ | 800 | 279 | | No reaction. |
| 23k | [HOCH₂C(CH₃)—CH₂—]₂S + (φO)₂C=O | LiOH | 600 | 245 | (†) | Yellow. |

*Reduced viscosity of 0.2% solution at 25° C.
† Very low.

Example 24.—Poly(neopentylene sulfide)

A solution of 10.0 g. (.098 mole) of 3,3-dimethyl thiacyclobutane in 20 ml. of methylene chloride was stirred mechanically in an inert atmosphere of nitrogen. While maintaining a temperature of 25–30° C., about one gram of PF₅ gas was introduced into the flask by a gas addition tube mounted about one centimeter above the surface of the liquid. Polymerization began almost immediately, as witnessed by an increase in temperature, and after three hours, the viscous solution was diluted with an equal volume of methylene chloride and washed till neutral to remove catalyst residues. The polymer solution was then coagulated in cold isopropanol and after drying at 65° C. in vacuo was found to weigh 9.6 g. (96%) and had a reduced viscosity in chloroform (.2% at 25° C.) of 0.41. The polymer was water-white in color and had a glass transition temperature below −50° C. In addition to being an elastomer, the polymer had good room temperature adhesive properties and was both hydrolytically and thermally stable. An elemental analysis was as follows:

Calc. ($C_5H_{10}S$): C, 58.76%; H, 9.86%; S, 31.38%. Found: C, 58.71%; H, 9.90%; S, 31.17%.

Example 25.—Bulk polymerization of 3,3-dimethyl thiacyclobutane

A ten-gram sample of 3,3-dimethyl thiacyclobutane (.098 mole) was stirred with 0.02 cc. of $BF_3$ etheract catalyst at room temperature. In about three hours the mixture was so viscous that stirring was almost impossible. At this point, 25 ml. of benzene was added and the resulting solution was coagulated in cold methanol to yield on drying 5.5 g. (55%) of poly(neopentylene sulfide) of reduced viscosity 0.66 (0.2% in $CHCl_3$ at 25° C.).

Example 26.—Solution polymerization of 3,3-dimethyl thiacyclobutane

To a solution of 5.0 g. of 3,3-dimethyl thiacyclobutane in 5.0 ml. of benzene was added 0.025 g. of $TaF_5$ catalyst. The reaction was allowed to proceed overnight after which time the solution was coagulated in cold methanol to yield after drying 1.8 g. of poly(neopentylene sulfide) having a reduced viscosity of 1.08 (0.2% in $CHCl_3$—25° C.

Example 27.—Bulk polymerization of 3,3-dimethyl thiacyclobutane with a $NbF_5$ catalyst Five grams of 3,3-dimethyl thiacyclobutane and .017 g. $NbF_5$ were stirred at ambient temperatures for twenty-four hours. After this time, 10 ml. of benzene was added and the polymer coagulated in cold methanol to yield after drying 2.0 g. of poly(neopentylene sulfide) at a reduced viscosity of 0.72 (0.2% in $CHCl_3$ at 25° C.).

Example 28.—Poly(2-methyl-2-ethyl propylenesulfide-1,3)

A solution of 10.0 g. (.086 mole) of 3-ethyl-3-methyl thiacyclobutane, 10 ml. of benzene and 0.37 ml. (about three mole percent) of $BF_3 \cdot (C_2H_5)_2O$ was stirred at ambient temperatures for thirty-six hours. The viscous polymer solution was then coagulated in 250 ml. of methanol to yield 7.1 g. of a colorless, elastomeric polymer having a reduced viscosity of 0.76 (.2% in chloroform).

Example 29.—Poly(neopentylene sulfone)

Poly(neopentylene sulfide), 2.8 g. (.028 mole) was slurried in 100 ml. of 90% formic acid and heated to 50° C. To the heterogeneous solution was added dropwise and at such a rate as to maintain a temperature of 50–60° C, 12.6 g. (0.112 mole, 100% excess) of 30% hydrogen peroxide. After the addition was complete the solution was stirred an additional two hours and the excess peroxide was then decomposed with $NaHSO_3$. The polysulfone, obtained in quantitative yield, was washed in water repeatedly and then dried over $P_2O_5$ in vacuo. The polymer was highly crystalline, as prepared, with a melting point of about 300° C. An elemental analysis was as follows:

Calc. for $C_5H_{10}SO_2$: C, 44.75%; H, 7.51%; S, 23.90%. Found: C, 44.54%; H, 6.36%; S, 23.71%.

Example 30.—Poly(2-methyl-2-ethyl propylenesulfone-1,3)

The product of Example 28 when treated as in Example 29 affords the corresponding sulfone poly(2-methyl-2-ethyl propylenesulfone-1,3) having a melting point of 285° C.

Example 31.—Copolymer of 3-ethyl-3-methyleneallyloxy thiacyclobutane and 3,3-dimethyl thiacyclobutane A solution of 30 g. (.29 mole) of 3,3-dimethyl thiacyclobutane and 6.0 g. (.03 mole) of 3-ethyl-3-methylene allyloxy thiacyclobutane in 30 ml. of methylene chloride containing 2.5 ml. of $BF_3 \cdot (C_2H_5)_2O$ catalyst was stirred at ambient temperatures for twenty-four hours. The viscous, water-white solution was then coagulated in methanol to produce in 69% yield a colorless, rubbery polymer having a reduced viscosity of 0.62 (0.2% in chloroform). This product displayed in its infrared spectrum, among others, a band at 6.08μ characteristic of unsaturation; a similar band was also present in the infrared spectrum of 3-ethyl-3-methyleneallyloxy thiacyclobutane.

The following analytical data were obtained:

| | Percent |
|---|---|
| C | 58.97 |
| H | 9.76 |
| S | 28.28 |
| O | 2.38 |

The product could be cured to an insoluble rubber by heating with benzoyl peroxide either in solution, or in bulk, at 70° C.

Copolymers from 3,3-dimethyl thiacyclobutane or 3-ethyl-3-methyl thiacyclobutane were also made with allyl glycidyl ether, 3,3-dimethyl oxacyclobutane, and glycidol. Copolymers of allyl glycidyl ether were crosslinked with peroxides, whereas with the glycidol materials, diisocyanates were employed for crosslinking.

Example 32.—Thermal stability of sulfone polymers

The thermal stability of these sulfone polymers was demonstrated by heating the polymer prepared in Example 11 for one hour at 155–255° C., followed by a three-hour heating period at 255–260° C. There was no discoloration or other visual signs of decomposition, no olefinic or $SO_2$ decomposition products and no loss in molecular weight. In point of fact, there was a slight increase in reduced viscosity from 0.46 to 0.49.

Example 33.—Thermal stability of bis-hydroxy sulfur monomers

The bis-hydroxy sulfur monomers of this invention are also uniquely thermally stable unlike their homologs which do not have completely substituted beta carbon atoms. This distinction is exemplified by the fact that bis(hydroxyneopentyl)sulfide can be distilled without decomposition (see Example 2) whereas the non-beta carbon substituted compound, bis(hydroxypropyl) sulfide decomposes on distillation (see S. Searles, J. Am. Chem. Soc., 73, 4515, 1951). Similarly the sulfone monomers of this invention are also thermally stable as shown by the fact that bis(hydroxyneopentyl) sulfone can be distilled at temperatures in excess of about 200° C./0.03 mm. This finding was further confirmed by heating this sulfone for two hours at 285–290° C. without decomposition.

Although the invention has been described in its preferred forms, it is understood that the present disclosure has been made only by way of example, and that numerous changes in the details may be resorted to without departing from the spirit and the scope of the invention.

What is claimed is:

1. The method of preparing linear normally solid poly(neopentylene sulfide) which comprises contacting 3,3-dimethyl thiacyclobutane at about 0 to 30° C. with a polymerizing amount of an acidic Friedel-Crafts catalyst selected from the group consisting of $PF_5$, $BF_3$ etherate, $TaF_5$ and $NbF_5$.

2. Method claimed in claim 1 wherein the acidic Friedel-Crafts catalyst is $PF_5$.

3. The method claimed in claim 1 in which the acidic Friedel-Crafts catalyst is $BF_3$ etherate.

4. The method claimed in claim 1 wherein the acidic Friedel-Crafts catalyst is $TaF_5$.

5. The method claimed in claim 1 wherein the acidic Friedel-Crafts catalyst is $NbF_5$.
6. A normally solid poly(neopentylene sulfide) consisting essentially of repeating units represented by the structure:
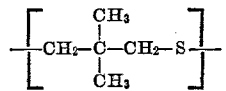
References Cited
UNITED STATES PATENTS
| 3,318,853 | 5/1967 | Edmonds | 260—79 |
| 3,320,217 | 5/1967 | Edmonds | 260—79 |
| 3,328,361 | 6/1967 | Edmonds | 260—79 |
JAMES A. SEIDLECK, Primary Examiner
U.S. Cl. X.R.
260—75, 77.5, 79.3, 327, 607, 657